US012711470B2

(12) United States Patent
Robinson

(10) Patent No.: US 12,711,470 B2
(45) Date of Patent: Aug. 18, 2026

(54) NEAR FIELD COMMUNICATION (NFC)-BASED ASSET MANAGEMENT SYSTEM AND METHOD

(71) Applicant: IRISS Holdings, Inc., Bradenton, FL (US)

(72) Inventor: Martin Robinson, Bradenton, FL (US)

(73) Assignee: IRISS Holdings, Inc., Bradenton, FL (US)

( * ) Notice: Subject to any disclaimer, the term of this patent is extended or adjusted under 35 U.S.C. 154(b) by 50 days.

(21) Appl. No.: 18/388,793

(22) Filed: Nov. 10, 2023

(65) Prior Publication Data

US 2025/0156818 A1 May 15, 2025

(51) Int. Cl.
*G06Q 10/20* (2023.01)
*H04B 5/77* (2024.01)

(52) U.S. Cl.
CPC ............... *G06Q 10/20* (2013.01); *H04B 5/77* (2024.01)

(58) Field of Classification Search
CPC .................... G06Q 20/00–425; H04L 9/00–50
See application file for complete search history.

(56) References Cited

U.S. PATENT DOCUMENTS 9,373,015 B2 6/2016 Swenson, Jr. et al.
9,503,592 B2 11/2016 Fein et al.
9,515,836 B2 12/2016 Tredoux et al.
9,747,768 B1 8/2017 Zehler et al.
10,026,033 B2 7/2018 Curtis et al.
10,404,682 B2 9/2019 Hoyer et al.
11,370,510 B2 6/2022 Lonn et al.
11,477,611 B2 10/2022 Xie et al.
2008/0201388 A1 8/2008 Wood et al.
2013/0104238 A1 4/2013 Balsan et al.
2013/0303085 A1 11/2013 Boucher et al.
2014/0151446 A1 6/2014 Bovell (Continued)

FOREIGN PATENT DOCUMENTS

KR 102131513 7/2020
KR 102131513 B1 7/2020
WO 2016163952 10/2016

OTHER PUBLICATIONS

Sipsas et al., Collaborative maintenance in flow-line manufacturing environments: An Industry 4.0 approach, Dec. 31, 2016.

(Continued)

*Primary Examiner* — Ari Shahabi
(74) *Attorney, Agent, or Firm* — Akerman LLP

(57) ABSTRACT

According to one example, a method includes receiving one or more work orders associated with work scheduled for one or more assets. Each of the work orders is at least partially viewable on a mobile device and each of the work orders is locked to editing from the mobile device. The method further includes receiving an indication that a NFC reader of the mobile device has received first data from a NFC tag associated with a first asset, unlocking a first work order associated with the first asset, and applying one or more edits to the first work order. The method also includes receiving an indication that the NFC reader of the mobile device has subsequently received second data from the NFC tag, re-locking the edited first work order, and causing the re-locked and edited first work order to be transmitted to a second device.

20 Claims, 2 Drawing Sheets

(56) References Cited

U.S. PATENT DOCUMENTS

| | | | |
|---|---|---|---|
| 2017/0140596 | A1 | 5/2017 | Retzlaff et al. |
| 2018/0165565 | A1* | 6/2018 | Curtis ................ G06V 30/2247 |
| 2019/0347888 | A1* | 11/2019 | Agbeyo ............... G07D 7/0043 |
| 2022/0217533 | A1 | 7/2022 | Drubay et al. |
| 2023/0334280 | A1 | 10/2023 | Mohebi et al. |

OTHER PUBLICATIONS

International Search Report and Written Opinion, PCT/US2024/054366, Jan. 17, 2025.

* cited by examiner

NEAR FIELD COMMUNICATION (NFC)-BASED ASSET MANAGEMENT SYSTEM AND METHOD

TECHNICAL FIELD

This disclosure relates generally to asset management, and more specifically to a near field communication (NFC)-based asset management system and method.

BACKGROUND

An asset (e.g., equipment) is typically managed (e.g., inspected, serviced, fixed, etc.) by a worker who goes on-site to the location of the asset in order to perform the work. For example, in order to inspect a piece of equipment, the worker typically goes to the location of the equipment and performs the inspection on the equipment. However, traditional methods and systems for ensuring that the work on the asset actually occurs may be deficient.

SUMMARY

According to one example, a method includes receiving (e.g., by a mobile device, by one or more processors of a mobile device) one or more work orders associated with work scheduled for one or more assets. Each of the one or more work orders is at least partially viewable on the mobile device and each of the one or more work orders is locked to editing from the mobile device. The method further includes receiving an indication that a NFC reader of the mobile device has received first data from a NFC tag associated with a first asset of the one or more assets as a result of the NFC reader of the mobile device having been positioned in communication proximity to the NFC tag associated with the first asset. Following the reception of the indication that the NFC reader of the mobile device has received the first data from the NFC tag associated with the first asset, the method further includes unlocking a first work order that is associated with the first asset, and applying one or more edits to the first work order. The method also includes receiving an indication that the NFC reader of the mobile device has subsequently received second data from the NFC tag associated with the first asset as a result of the NFC reader of the mobile device having been subsequently positioned in communication proximity to the NFC tag associated with the first asset. Following the reception of the indication that the NFC reader of the mobile device has subsequently received the second data from the NFC tag associated with the first asset, the method also includes re-locking the edited first work order so that the re-locked and edited first work order is locked to further editing from the mobile device, and causing the re-locked and edited first work order to be transmitted to a second device.

According to a second example, tangible, non-transitory computer-readable media includes program instructions that are configured, when executed, to cause a mobile device to perform various functions. The functions include receiving one or more work orders associated with work scheduled for one or more assets. Each of the one or more work orders is at least partially viewable on the mobile device and each of the one or more work orders is locked to editing from the mobile device. The functions further include receiving an indication that a NFC reader of the mobile device has received first data from a NFC tag associated with a first asset of the one or more assets as a result of the NFC reader of the mobile device having been positioned in communication proximity to the NFC tag associated with the first asset. Following the reception of the indication that the NFC reader of the mobile device has received the first data from the NFC tag associated with the first asset, the functions also include unlocking a first work order that is associated with the first asset, and applying one or more edits to the first work order. The functions further include receiving an indication that the NFC reader of the mobile device has subsequently received second data from the NFC tag associated with the first asset as a result of the NFC reader of the mobile device having been subsequently positioned in communication proximity to the NFC tag associated with the first asset. Following the reception of the indication that the NFC reader of the mobile device has subsequently received the second data from the NFC tag associated with the first asset, the functions further include re-locking the edited first work order so that the re-locked and edited first work order is locked to further editing from the mobile device, and causing the re-locked and edited first work order to be transmitted to a second device.

According to a third example, a mobile device includes a NFC reader, one or more memory units storing one or instructions, and one or more processor coupled to the memory units. The processors are configured, upon executing the one or more instructions, to receive one or more work orders associated with work scheduled for one or more assets. Each of the one or more work orders is at least partially viewable on the mobile device and each of the one or more work orders is locked to editing from the mobile device. The processors are also configured, upon executing the one or more instructions, to receive an indication that the NFC reader of the mobile device has received first data from a NFC tag associated with a first asset of the one or more assets as a result of the NFC reader of the mobile device having been positioned in communication proximity to the NFC tag associated with the first asset. Following the reception of the indication that the NFC reader of the mobile device has received the first data from the NFC tag associated with the first asset, the processors are further configured, upon executing the one or more instructions, to unlock a first work order that is associated with the first asset, and apply one or more edits to the first work order. The processors are further configured, upon executing the one or more instructions, to receive an indication that the NFC reader of the mobile device has subsequently received second data from the NFC tag associated with the first asset as a result of the NFC reader of the mobile device having been subsequently positioned in communication proximity to the NFC tag associated with the first asset. Following the reception of the indication that the NFC reader of the mobile device has subsequently received the second data from the NFC tag associated with the first asset, the processors are further configured, upon executing the one or more instructions, to re-lock the edited first work order so that the re-locked and edited first work order is locked to further editing from the mobile device, and cause the re-locked and edited first work order to be transmitted to a second device.

BRIEF DESCRIPTION OF THE FIGURES

For a more complete understanding of the present disclosure and one or more examples of the features and advantages of the present disclosure, reference is now made to the following description, taken in conjunction with the accompanying drawings, in which.

DETAILED DESCRIPTION

Figure 1:
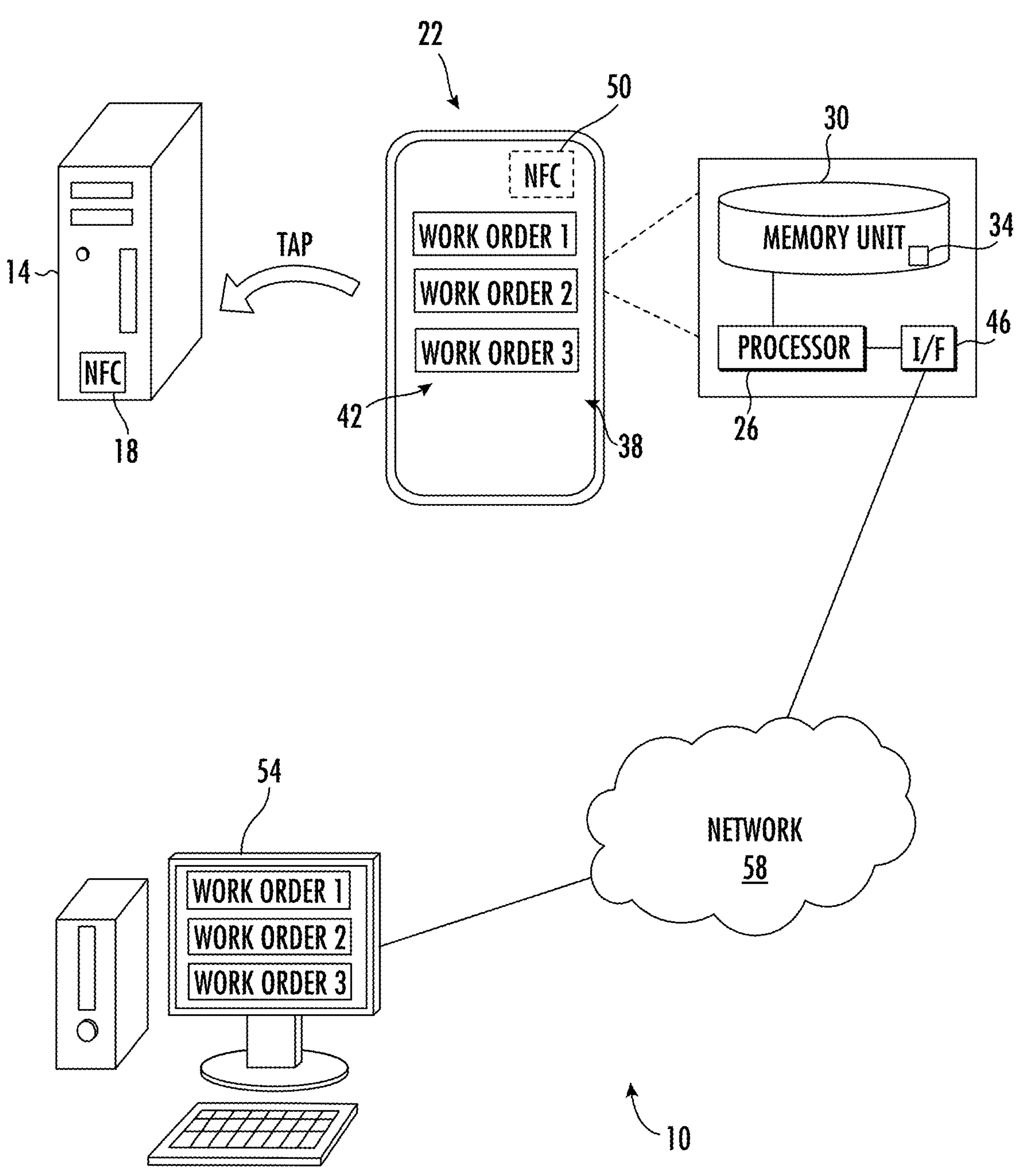
FIG. 1 illustrates an example asset management system 10.
Figure 2:
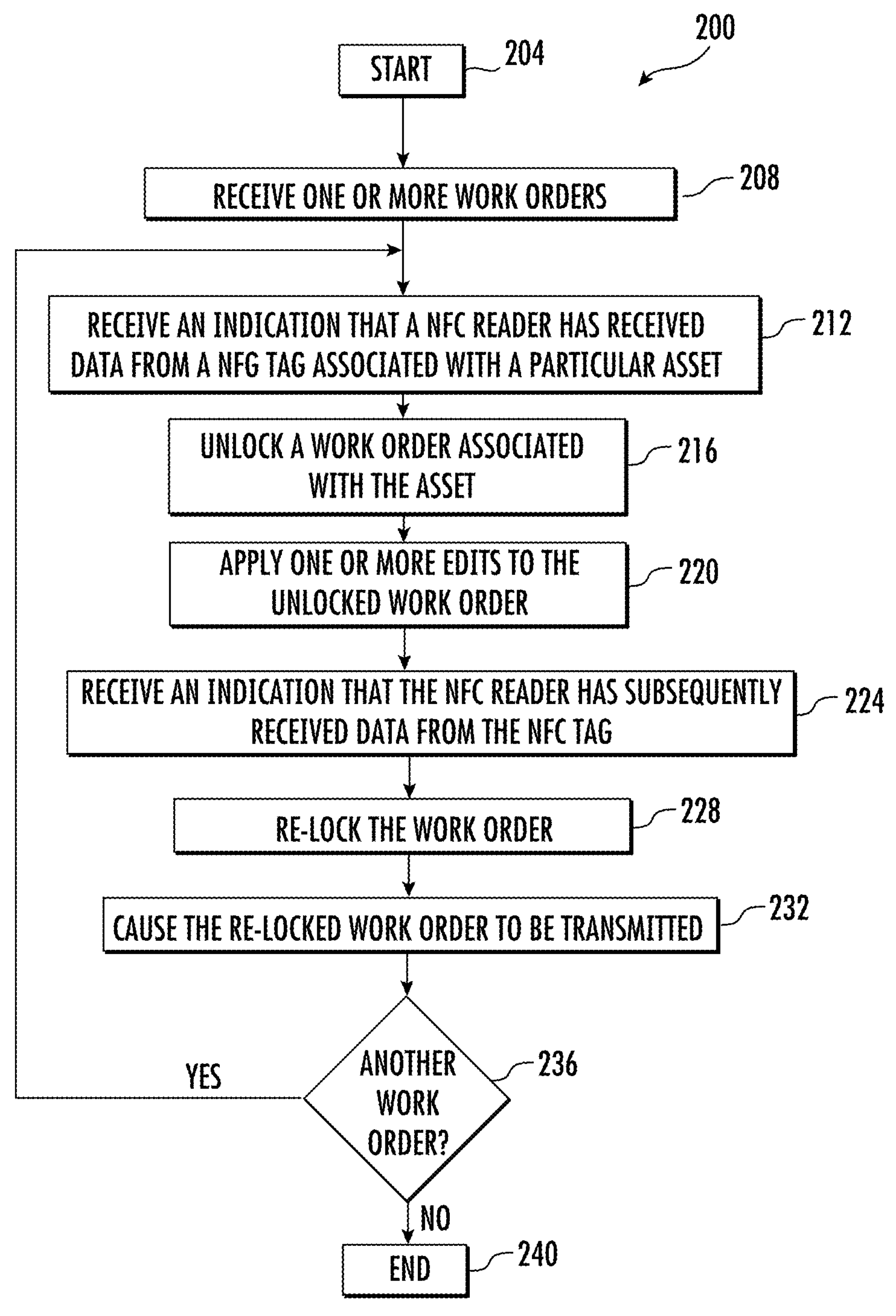
FIG. 2 illustrates an example method of implementation of the asset management system 10 of FIG. 1.

Examples in the present disclosure are best understood by referring to FIGS. 1-2 of the drawings, like numerals being used for like and corresponding parts of the various drawings.

An asset (e.g., equipment) is typically managed (e.g., inspected, serviced, fixed, etc.) by a worker who goes on-site to the location of the asset in order to perform the work. For example, in order to inspect a piece of equipment, the worker typically goes to the location of the equipment and performs the inspection on the equipment. However, traditional methods and systems for ensuring that the work on the asset actually occurs may be deficient. For example, sometimes a worker may claim that they performed work on an asset (e.g., inspected a piece of equipment), when they actually did not. To help ensure that the work actually occurs, traditional systems and methods may require the worker to take a picture of the asset when they are working on it, or to scan a code (e.g., a barcode, quick response code) included on the asset when they are working on the asset. Unfortunately, this may not fix the problem. For example, the worker may have previously taken a picture of the asset or code. The worker can then just use that old picture each subsequent time to make it seem like they have performed the work. This may be especially problematic when the weather is bad (e.g., it is raining) and the worker does not want to go outside to work on the asset. Additionally, the worker could just take a picture or scan the code, and then leave without actually performing the work.

In contrast to this, the asset management system 10 of FIG. 1 may address one or more of these deficiencies. For example, the asset management system 10 of FIG. 1 may include one or more assets 14 that each include a near field communication (NFC) tag 18, and the system 10 may further include a mobile device 22 that can be carried by a worker. In one manner of operation of this example, the worker may be scheduled to work on a particular asset. To perform this work, the worker may use the mobile device 22 to scan the NFC tag 18 of the asset 14 by, for example, tapping the mobile device 22 to the NFC tag 18. This action may unlock a work order associated with the work to be performed on the asset 14. That is, the NFC tag 18 may be used as a key to unlock a work order. Prior to being unlocked, the work order may not be edited by the worker using the mobile device 22. However, with the work order unlocked, the worker may being editing the work order (e.g., to indicate that the work has been complete, to attach images of the asset 14 and/or the work being done, to indicate that the asset 14 passed or failed an inspection, etc.). When the worker is finished working on the asset 14, the worker may use the mobile device 22 to scan the NFC tag 18 of the asset 14 a second time by, for example, tapping the mobile device 22 to the NFC tag 18 a second time. This action may re-lock the edited work order. That is, the NFC tag 18 may be used as a key to re-lock the work order. Furthermore, the scanning of the NFC tag 18 a second time may also cause the re-locked and edited work order to be transmitted to a management device 54 for record keeping, review by a supervisor, etc. In some examples, by unlocking and re-locking a work order via scans of the NFC tag 18 of the asset 14, the system 10 may help reduce the chances that a worker can edit a work order before or after visiting an asset 14 to be worked on. Additionally, in some examples, by requiring a first scan at the beginning of work, and a second scan at the end of work, the system 10 may help reduce the chances that the work was not actually done, as it may ensure that the worker is near (e.g., in front of) the asset 14 the entire time they are working. That is, it may ensure that the job is done entirely on site (e.g., it may prevent the worker from scanning the NFC tag 18 a first time and then walking off), in some examples.

FIG. 1 illustrates an example asset management system 10 that utilizes near field communication. In the example illustrated in FIG. 1, system 10 includes one or more assets 14 that each include an NFC tag 18, one or more mobile device 22, one or more management devices 54, and one or more networks 58.

In the example illustrated in FIG. 1, the system 10 includes one or more assets 14. The asset 14 refers to anything that may need to be managed or otherwise worked on. Examples of an asset 14 include equipment (e.g., pump(s), motor(s), server(s), switchgear(s), electrical system(s), mechanical system(s), computer(s), etc.), items (e.g., fire extinguisher(s), sensor(s), etc.), industrial device(s), anything for which a work order may be generated, anything that work may be performed on, anything that maintenance may be performed on, any other thing that may need to be managed or otherwise worked on, or any combination of the preceding. In some examples, an asset 14 may be user-defined (e.g., it can be anything that a user or system designates or determines is an asset). In the example illustrated in FIG. 1, the asset 14 is a server. The system 10 may include any number of assets 14.

In the example illustrated in FIG. 1, each asset 14 includes an NFC tag 18. An NFC tag 18 refers to a device or item that may utilize near field communication (NFC) to transfer data to another device or item. In some examples, the NFC tag 18 may communicate data to an NFC reader 50 when the NFC reader 50 is in communication proximity to the NFC tag 18. In some examples, the NFC tag 18 may store data (e.g., on a microchip), and may then communicate that data to the NFC reader 50 when the NFC reader 50 energizes the NFC tag 18 (e.g., energizes a coil of the NFC tag 18) via electromagnetic induction. Examples of the NFC tag 18 include an NFC tag type 1, NFC tag type 2, NFC tag type 3, NFC tag type 4, NFC tag type 5, any other device or item that utilizes near field communication to transfer data to another device or item, or any combination of the preceding.

The NFC tag 18 of an asset 14 may uniquely identify the asset 14. That is, the data stored in the NFC tag 18 may be a code that uniquely identifies the asset 14, in some examples. In such an example, by scanning the NFC tag 18, a mobile device 22 can determine which asset has been scanned by the mobile device 22.

The NFC tag 18 may be positioned in or on the asset 14. In some examples, the NFC tag 18 may include a sticker (or other adhesive) that allows the NFC tag 18 to be positioned on the asset 14 and remain positioned on the asset 14. In other examples, the NFC tag 18 may be installed inside the asset 14. In some examples, an asset 14 may include an NFC tag 18 that is already built into (or on) the asset 14.

In the example illustrated in FIG. 1, the system 10 further includes one or more mobile devices 22. The mobile device 22 may be any device that is both mobile (e.g., it can be carried around by a human), and that also receives data, stores data, transmits data, presents data for display to a user, and/or receives data input by a user. For example, the mobile device 22 may be (or may include) a laptop, a computer tablet, an iPad™, a mobile telephone (such as a Smartphone), an electronic notebook, a personal digital assistant, any other mobile computing or processing device, any other device that is both mobile and that can also receive data, store data, transmit data, present data for display to a user, and/or receive data input by a user, or any combination of the preceding. In the example illustrated in FIG. 1, the mobile device 22 is a Smartphone. Furthermore, in the example illustrated in FIG. 1, the mobile device 22 includes a computer/data processor 26 (e.g., hardware processor), a data storage medium 30 (e.g., memory unit) comprising instructions 34 executable by the processor 26 to perform the functions of the mobile device 22, a display 38 that may present data for display to a user (e.g., to a user of the mobile device 22), a user interface 42 (e.g., a keyboard, a mouse, a touch screen, etc.) that may allow a user to interact with the mobile device 22 and/or software executed on the mobile device 22, and a communication port 46 (e.g., receiver, transmitter, transceiver, network interface) configured to receive and transmit data (e.g., receive requests for data, transmit data). In some examples, the instructions 34 may be (or may include) one or more operating systems of the mobile device 22, one or more software applications installed on the mobile device 22 (e.g., an "app" downloadable from an app store), any other type of instruction(s), or any combination of the preceding.

In the example illustrated in FIG. 1, the mobile device 22 further includes one or more NFC readers 50. An NFC reader 50 refers to a device or item that may utilize near field communication to receive data from another device or item. In some examples, the NFC reader 50 may receive data from an NFC tag 18 when the NFC reader 50 is in communication proximity to the NFC tag 14. In some examples, the NFC reader 50 may energize the NFC tag 18 (e.g., energize a coil of the NFC tag 18) via electromagnetic induction, causing data stored on the NFC tag 18 (e.g., stored on a microchip of the NFC tag 18) to be communicated to the NFC reader 50. This reception of data from the NFC tag 18 is referred to herein as scanning the NFC tag 18. Examples of an NFC reader 50 include an NFC chip, any other device or item that utilizes near field communication to receive data from another device or item, or any combination of the preceding.

The NFC reader 50 may be positioned in or on the mobile device 22. In some examples, the NFC reader 50 may be an external device that is attached to (or otherwise in communication with) the mobile device 22. In other examples, the NFC reader 50 may be installed inside the mobile device 22 (e.g., it may be built into the mobile device 22). The NFC reader 50 may be in communication with the processor(s) 26 of the mobile device 22. As such, the NFC reader 50 may be able to send indications to the processor(s) 26 that the NFC reader 50 has scanned a NFC tag 18.

The mobile device 22 may be associated with a user, such as a worker that is going to manage or otherwise work on one or more of the assets 14. For example, the mobile device 22 may be a Smartphone that is owned by the worker or assigned to the worker by an employer. In such an example, the worker (or other user) may utilize the mobile device 22 to assist them in managing or otherwise working on the asset(s) 14. In such an example, the worker (or other worker) must bring the mobile device 22 with them when they go to manage or otherwise work on the asset(s) 14.

As is discussed above, the NFC tag 18 may communicate data, and the NFC reader 50 may receive the data when the NFC reader 50 is in communication proximity to the NFC tag 14. Communication proximity between the NFC reader 50 and the NFC tag 18 refers to a distance between the NFC tag 18 and the NFC reader 50 (and/or mobile device 22) that is sufficiently small enough to allow the initiation and transfer of data via near field communications. In some examples, the distance may refer to a distance where a portion of the mobile device 22 (e.g., a portion of the mobile device 22 near where the NFC reader 50 is installed in the mobile device 22) is in physical contact with the NFC tag. This may occur, for example, when the mobile device 22 is tapped to the NFC tag 18. The portion of the mobile device 22 that is in contact with the NFC tag may refer to a portion of the actual mobile device 22 (e.g., the mobile device 22 without an external cover or case) or a portion of an external cover or case that is installed on or around the mobile device 22, or both.

In some examples, the distance may refer to a distance where a portion of the mobile device 22 (e.g., a portion of the mobile device 22 near where the NFC reader 50 is installed in the mobile device 22) is within approximately 4 centimeters (e.g. 4 centimeters +/−1 centimeter) of the NFC tag 18. This may occur, for example, when the mobile device 22 is held very close to the NFC tag 18 (but is not directly contacting the NFC tag 18). The portion of the mobile device 22 that is within approximately 4 centimeters of the NFC tag 18 may refer to a portion of the actual mobile device 22 (e.g., the mobile device 22 without a cover or case) or a portion of an external cover or case that is installed on or around the mobile device 22, or both.

In some examples, the distance may refer to a distance where a portion of the NFC reader 50 itself is in physical contact with the NFC tag 18, or where a portion of the NFC reader 50 itself is within approximately 4 centimeters of the NFC tag 18. The portion of the NFC reader 50 may refer to a portion of the actual NFC reader 50 (e.g., the NFC reader 50 without an external cover or case) or a portion of an external cover or case that is installed on or around the NFC reader 50, or both.

In the example illustrated in FIG. 1, the system 10 further includes one or more management devices 54. The management device 54 may be any device that receives data, stores data, transmits data, presents data for display to a user, and/or receives data input by a user. For example, the management device 54 may be (or may include) a personal computer, a laptop, a computer tablet, an iPad™, a mobile telephone (such as a Smartphone), an electronic notebook, a personal digital assistant, a host computer, a workstation, a web server, a network server, any suitable remote server, a mainframe, a file server, any other computing or processing device, any other device for receiving data, storing data, transmitting data, presenting data for display to a user, and/or receiving data input by a user, or any combination of the preceding. The functions of the management device 54 may be performed by any suitable combination of one or more servers or other components at one or more locations. In an example where the management device 54 is a server, the server may be a private server, and the server may be a virtual or physical server. The server may include one or more servers at the same or remote locations. Also, the management device 54 may be (or may include) any suitable component that functions as a server. In the example illustrated in FIG. 1, the management device 54 is a personal computer. Furthermore, the management device 54 may include a computer/data processor, data storage medium (e.g., memory unit) comprising instructions executable by the processor to perform the functions of the management device 54, a display that may present data for display to a user (e.g., to an administrator of the management device 54), a user interface (e.g., a keyboard, a mouse, a touch screen, etc.) that may allow a user to interact with the management device 54 and/or software executed on the management device 54, and a communication port (e.g., receiver, transmitter, transceiver, network interface) configured to receive and transmit data (e.g., receive requests for data, transmit data).

In some examples, the management device 54 may be used to create one or more work orders, assign one or more work orders to particular worker(s), transmit the work orders to mobile device(s) 22, receive edited work orders (when the work has been complete), store the work orders (e.g., edited work orders, un-edited work orders), store information about the asset(s) 14, store information about the NFC tag(s) 18, perform any other function related to the system 10, or any combination of the preceding.

In the example illustrated in FIG. 1, the system 10 also includes one or more networks 58. The network 58 represents any suitable network operable to facilitate communication between the components of system 10, such as mobile devices 22 and management devices 54. The network 58 may include any interconnecting system capable of transmitting audio, video, signals, data, information, messages, or any combination of the preceding. The network 58 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, any other suitable communication link, including combinations thereof, operable to facilitate communication between the components of system 10, or any combination of the preceding.

Modifications, additions, or omissions may be made to system 10 without departing from the scope of the disclosure. For example, system 10 may include any number of assets 14, NFC tags 18, mobile devices 22, NFC readers 50, management devices 54, and/or networks 58 (and/or any number of components, such as processors or memory units illustrated or described in the above devices). Also, any suitable logic may perform the functions of system 10 and the components and/or devices within system 10. Furthermore, one or more components of system 10 may be separated, combined, and/or eliminated.

FIG. 2 illustrates an example method 200 of implementation of the asset management system 10 of FIG. 1. In the illustrated example, each of the steps of method 200 are performed by the mobile device 22 (e.g., performed by the processor(s) 26 of the mobile device 22). In other examples, one or more of the steps of method 200 may be performed by any other device (e.g., any other device of FIG. 1) or entity.

The method 200 starts at step 204. At step 208, one or more work orders associated with work scheduled for one or more assets 14 is received.

A work order may refer to documentation (e.g., electronic documentation) that describes, orders, or otherwise conveys work that is scheduled be performed on an asset 14. In some examples, an employer may prepare a work order (e.g., using the management device 22), and then send it to a worker (e.g., to the mobile device 22 carried by the worker), and the worker will then use the work order to understand the type of work that is scheduled to be performed on an asset 14.

A work order may include any information that describes, orders, or otherwise conveys work that is scheduled be performed on an asset 14. For example, the work order may include identifier(s) of an asset 14 (e.g., the type of asset 14, the name of the asset 14), identifier(s) of a NFC tag 18 of the asset 14 (e.g., a code that uniquely identifies the asset 14), a location of the asset 14 (e.g., address of the asset 14, a room number the asset 14 is located in), a description of the work or task to be performed (e.g., inspection, fix, survey, perform maintenance), an identifier of who the work is assigned to (e.g., assigned to Worker 1), a time/date that completion of the work is due (e.g., a deadline), a priority listing (e.g., urgent, not-urgent), a list of tools/items that may be needed to perform the work (e.g., an infra red scanner, an ultrasound device, a part that may be need to be replaced in the asset 14, etc.), status of the work (e.g., open, closed), a time/date that the work order was assigned or opened, any other information that describes, orders, or otherwise conveys work that is scheduled be performed on an asset 14, or any combination of the preceding.

In some examples, the work order includes one or more data entry areas (e.g., fillable rows or sections, clickable boxes, clickable flags) that may be used by a user of the mobile device 22 to document the work being performed on the asset 14. These data entry areas may allow the user to add text to the work order (e.g., a textual comment that explains what the worker found while performing the work), attach one or more images or videos associated with the work (e.g., attach an infrared scan of the asset 14, attach a picture of damage to the asset 14 before work was started and attach another picture of the asset 14 after the damage is fixed), update the status of the work order (e.g., change the status from open to closed), update the status of the asset 14 (e.g., change the status of the asset 14 from broken to working), update a test result of the asset 14 (e.g., signify that the asset 14 passed or failed a particular test), edit the work order in any other manner, or any combination of the preceding.

In some examples, the work order may be either locked or unlocked. When locked (or re-locked), the work order is not editable by the worker using the mobile device 22, in some examples. For example, the work order may be in a read only mode when locked. In such a mode, all (or a portion, such as only a summary) of the work order may be viewed on a display of the mobile device 22, but no edits may be made to the work order. In other examples, when locked (or re-locked), the work order may only be viewable in a list format (with other work orders), but may the work order may be prevented from opening. In such an example, the list format may include a portion of the information of the work order (e.g., the location of the asset, a short description of the work/task), but may not include all of the information. In some examples, the locked mode may allow the worker (or other user of the mobile device 22) to view the work order and at least a portion of the information about the work order, so as to be prepared for the work when they arrive at the asset 14. For example, if the work order is for an infra red scan of the asset 14, the worker will know to bring their infra red scanner. In some examples, while the locked mode may prevent a user of the mobile device 22 from editing the work order, the work order may still be editable by the management device 54. This may allow a supervisor to edit portions of the work order (e.g., to change the description, which will then be updated on the mobile device 22) if changes to the work order are needed or desired.

When unlocked, the work order is editable by the worker using the mobile device 22, in some examples. In such a mode, the worker can view all of the work order, and the worker can input information (e.g., text, images, etc.) into the data entry areas of the work order. The unlocked mode may allow the worker (or other user of the mobile device 22) to document the work that they have performed on the asset 14.

Any number of work orders may be received at step 208, and the work order(s) may be for any number of assets 14. In some examples, a mobile device 22 (e.g., processor(s) 26 of the mobile device 22) may receive only the work orders that have been assigned to a worker (or user) associated with the mobile device 22. In other examples, a mobile device 22 may receive all of the work orders (e.g., all current work orders assigned to all the workers) or an entire subset of the work orders (e.g., all work orders for infra red scanning, even if the work order is assigned to another worker), but the mobile device 22 may only be able to unlock a work order that has been assigned to a worker (or user) associated with the mobile device 22.

The work order(s) may be received at step 208 in any manner. For example, the work orders may be received over the network(s) 42 (e.g., over the Internet) from the management device 54. In another example, the work orders may be received via a hardwire download (e.g., connecting the mobile device 22 to the management device 54 via, for example, a universal serial bus (USB) cord). The work order(s) may also be received at step 208 at any time. For example, work order(s) may be continuously received throughout the day as they are created. As another example, the work order(s) may only be received at a predetermined time (e.g., at the start of the worker's shift).

Following reception of a work order, all or a portion of the work order may be viewable on the mobile device, in some examples. However, in some examples, all of the received work order(s) are in the locked mode. Each work order can then be subsequently unlocked (e.g., to perform the work), and then re-locked (e.g., when the work is complete), in some examples, as is discussed further below.

Following step 208, the method 200 may move to step 212, where an indication that a NFC reader 50 of the mobile device 22 has received data from a NFC tag 18 associated with a particular asset 14, is received. In some examples, a NFC reader 50 may receive data from a NFC tag 18 as a result of the NFC reader 50 having been positioned in communication proximity to the NFC tag 18 (where communication proximity is discussed above in detail). In some examples, this may occur when a worker arrives at the location of an asset 14 and then taps a portion of the mobile device 22 (e.g., the portion of the mobile device 22 where the NFC reader 50 is located, a portion of an external case or cover of the mobile device 22 that coincides with the location of the NFC reader 50) to the NFC tag 18 of the asset 14, causing direct contact. In other examples, this may occur when a worker arrives at the location of an asset 14 and then positions a portion of the mobile device 22 (e.g., the portion of the mobile device 22 where the NFC reader 50 is located, a portion of an external case or cover of the mobile device 22 that coincides with the location of the NFC reader 50) closely over the NFC tag 18 of the asset 14 (e.g., within 4 centimeters), but not causing direct contact. This reception of data from a NFC tag 18 is referred to herein as scanning the NFC tag 18.

The indication may be any data that indicates that the NFC reader 50 of the mobile device 22 has received data from a NFC tag 18 associated with a particular asset 14. For example, the indication may be the received data, itself (e.g., a unique code stored by the NFC tag 18), or it may be data, code, or any other identifier that indicates that the data has been received.

Following step 212, the method 200 may move to step 216, where a work order associated with an asset 14 is unlocked. In some examples, this unlocking of the work order allows the work order to be edited using the mobile device 22 (as is discussed above). As such, now that it is confirmed that the worker is in close proximity to the asset 14, the work order may now be editable by the worker so as to, for example, allow the worker to document the work being performed and, when done, to indicate that the work is complete, in some examples.

The work order may be unlocked in any manner. For example, the work order may be changed from a read only mode to an editable mode. As another example, the work order may be changed so as to open the data entry areas of the work order (e.g., to allow them to be filled in, to allow images to be added, etc.). As a further example, the work order may be allowed to open (e.g., when the user clicks on it), instead of only being shown in a list format (with other work orders).

In some examples, only a work order associated with the scanned NFC tag 18 (i.e., the NFC tag 18 from which data was received) is unlocked. For example, the mobile device 22 may match a unique code received from the scanned NFC tag 18 to a unique code entry in each work order. Only the matched work order is unlocked, in some examples. In some examples, if a particular asset 14 has multiple associated work orders, only one of the work orders may be unlocked (instead of all of them). In such an example, the user of the mobile device 22 may choose which of the multiple work order to unlock.

In some examples, the unlocking may be automatic (e.g., without further human intervention). In other examples, the unlocking may only occur if the user of the mobile device 22 subsequently accepts the unlocking (e.g., by clicking "Yes" on a prompt to unlock). In some examples, a particular work order may only be unlocked if the work order is currently open (e.g., it has been clicked on) on the display of the mobile device 22. That is, the worker may need to first open the work order on the mobile device 22 before scanning the corresponding NFC tag 18. In other examples, unlocking of a work order may cause it to automatically open on the display of the mobile device 22. In some examples, scanning an NFC tag 18 may filter the work orders listed (or otherwise available) on the mobile device 22. For example, after an NFC tag 18 is scanned, the mobile device 22 may display only the work order(s) that correspond to the asset 14 that includes the scanned NFC tag 18. If there is more than one displayed work order for that asset 14, the user may subsequently open a particular work order for that asset 14. This opening of a particular work order may cause that work order to be unlocked (while the remaining work order(s) for that asset 14 may remain locked)

Following step 216, the method 200 may move to step 220, where one or more edits are applied to an unlocked work order. The edits may be applied in any manner. For example, the edits may input by a user of the mobile device 22 (e.g., the user may type the word "Complete"), and the mobile device 22 may apply these edits to the work order (e.g., the processor(s) 26 of the mobile device 22 may cause the word "Complete" to be added to a data entry area of the work order).

Any edit(s) (or type of edit(s)) may be applied to the unlocked work order. For example, text may be added to the work order (e.g., a textual comment that explains what the worker found while performing the work), one or more images or videos associated with the work may be attached to the work order (e.g., attach an infrared scan of the asset 14, attach a picture of damage to the asset 14 before work was started and attach another picture of the asset 14 after the damage is fixed), the status of the work order may be updated (e.g., change the status from open to closed), the status of the asset 14 may be updated (e.g., change the status of the asset 14 from broken to working), a test result of the asset 14 may be updated (e.g., signify that the asset passed or failed a particular test), the work order may be edited in any other manner, or any combination of the preceding.

In some examples, the edits may allow the worker to document the work being performed on the asset 14. Additionally, when the work is complete, the edits may allow the worker to document that the work has been complete on the asset 14. That is, the edits may help ensure that the work is actually being done.

Following step 220, the method 200 may move to step 224, where an indication that the NFC reader 50 of the mobile device 22 has subsequently received data from the NFC tag 18 associated with the particular asset 14, is received. In some examples, the NFC reader 50 may subsequently receive data from the NFC tag 18 as a result of the NFC reader 50 having been positioned in communication proximity to the NFC tag 18 a second time (or a subsequent time). In some examples, this may occur when the worker finishes the work on the asset 14 and then taps a portion of the mobile device 22 (e.g., the portion of the mobile device 22 where the NFC reader 50 is located, a portion of an external case or cover of the mobile device 22 that coincides with the location of the NFC reader 50) to the NFC tag 18 of the asset 14, causing direct contact, a second time (or a subsequent time). In other examples, this occur when the worker finishes the work on the asset 14 and then positions a portion of the mobile device 22 (e.g., the portion of the mobile device 22 where the NFC reader 50 is located, a portion of an external case or cover of the mobile device 22 that coincides with the location of the NFC reader 50) closely over the NFC tag 18 of the asset 14 (e.g., within 4 centimeters), but not causing direct contact, a second time (or a subsequent time).

The indication may be any data that indicates that the NFC reader 50 of the mobile device 22 has received data from a NFC tag 18 associated with a particular asset 14. For example, the indication may be the received data, itself (e.g., a unique code stored by the NFC tag 18), or it may be data, code, or any other identifier that indicates that the data has been received.

Following step 224, the method 200 may move to step 228, where the work order is re-locked. In some examples, this re-locking of the work order prevents the work order from being further edited using the mobile device 22.

The work order may be re-locked in any manner. For example, the work order may be changed from an editable mode to a read only mode. As another example, the work order may be changed so as to close the data entry areas of the work order (e.g., preventing them from being filled in, preventing images from being added, etc.). As a further example, the work order may be closed (without the ability to open it back up). In such an example, the work order may still be viewable in a list format (with the other work orders), but the mobile device 22 may prevent that work order from being selected or otherwise opened. As another example, the work order may be closed and it may no longer be viewable in any way on the mobile device 22.

In some examples, the re-locking may be automatic (e.g., without further human intervention). In other examples, the re-locking may only occur if the user of the mobile device 22 subsequently accepts the unlocking (e.g., by clicking "Yes" on a prompt to unlock). In some examples, a particular work order may only be re-locked if the work order is currently open (e.g., it has been clicked on) on the display of the mobile device 22. That is, the worker may need to have the work order open on the mobile device 22 before scanning the corresponding NFC tag 18 a subsequent time. In other examples, a work order may be re-locked even if the work order is not currently open on the display of the mobile device 22.

Following step 228, the method 200 may move to step 232, where the re-locked work order is caused to be transmitted. The re-locked work order may be caused to be transmitted in any manner. For example, the processor(s) 26 of the mobile device 22 may send the re-locked work order to the communication port 46 of the mobile device 22, thereby causing the re-locked work order to be transmitted by the communication port 46 of the mobile device 22. In some examples, causing the re-locked work order to be transmitted may include (or alternatively refer to) actually transmitting the re-locked work order (as opposed to just causing the transmission). For example, the steps of method 200 may be performed by the mobile device 22 as a whole (as opposed to just the processor(s) 26 of the mobile device 26). In such an example, the mobile device 22 may cause the transmission of the re-locked work order, or actually transmit the re-locked work order, or both. As another example, the processor(s) 26 of the mobile device 26 may control the actions of the communication port 46 of the mobile device 22, and therefore could be said to cause the transmission of the re-locked work order, or actually transmit the re-locked work order, or both.

In some examples, the re-locked work order may be transmitted to another device. This other device may be any device other than the mobile device 22. For example, the other device may be the administration device 54 of FIG. 1. In such an example, the administration device 54 may store the work order for record keeping, review by a supervisor, any other reason, or any combination of the preceding.

The re-locked work order may be transmitted in any manner. For example, the re-locked work order may be transmitted over the network(s) 58 (e.g., over the Internet) to the management device 54. In another example, the re-locked work order may be transmitted via a hardwire upload (e.g., connecting the mobile device 22 to the management device 54 via, for example, a USB cord). The re-locked work order may also be transmitted at this step at any time. For example, the re-locked work order may be transmitted as soon as it re-locked. As another example, the re-locked work order may be transmitted as soon as the mobile device 22 has a connection to one or more network(s) 58. In such an example, if the mobile device 22 does not currently have any wireless service (e.g., WiFi, cellular service), the transmission of the re-locked work order may be delayed (e.g., it may be cached) until the mobile device 22 has wireless service once again. As another example, the re-locked work order may only be transmitted at a predetermined time (e.g., at the end of the worker's shift).

In some examples, the causing of the transmission (and/or the transmission) may be automatic (e.g., without further human intervention). In other examples, the causing of the transmission (and/or the transmission) may only occur if the user of the mobile device 22 subsequently accepts the transmission (e.g., by clicking "Yes" on a prompt to transmit the re-locked work order).

Following step 232, the method 200 may move to step 236, where it is determined if additional work orders are going to be worked on. If additional work orders are going to be worked on, the method 200 may move back to step 212, where an indication that a NFC reader 50 of the mobile device 22 has received data from a NFC tag 18 associated with a particular asset 14, is received. That is, the worker (or other user of the mobile device 22) may have decided to work on another asset 14 or work on another work order for the same asset 14. In such an example, the worker may scan the NFC tag 18 of the asset 14, causing steps 212-232 to be repeated. The steps may be repeated any number of times, for any number of work order(s) and/or any number of asset(s) 14.

In contrast, if additional work orders are not going to be worked on, the method may move to step 240, where method 200 ends. Modifications, additions, or omissions may be made to method 200. For example, one or more steps of method 200 may be optional, or may not be performed. As a further example, the steps of method 200 may be performed in parallel or in any suitable order.

In some examples, the method 200 may include further steps and/or the system 10 may include additional capabilities. For example, a particular work order may take a longer time than a worker currently has. In such an example, the worker may need to come back to the asset 14 (e.g., the next day, after lunch) to finish. As such, the worker may scan the NFC tag 18 a second time, causing the work order to be re-locked (but not causing it to be transmitted). Then, when the worker comes back, the worker can re-scan the NFC tag 18 a third time, causing it to be unlocked, so that the worker can continue working on the asset 14. When the worker has completed the work order, the next scan of the NFC tag 18 may re-lock the work order and cause the re-locked work order to be transmitted. In such an example, each second scan of the NFC tag 18 may cause a prompt to be displayed requesting confirmation on whether the work is completed. If the work is not completed, the re-locked work order may not be transmitted. If the work is completed, the re-locked work order may be transmitted.

As another example, a particular work order may have a duration that may require a worker to re-scan the NFC tag 18 multiple times during the day (e.g., to ensure that the worker is still in close proximity to the asset 14). For example, the work order may include a running timer that prompts the worker to re-scan the NFC tag 18 at a particular interval (e.g., every hour, every 2 hours). If the worker does not re-scan the NFC tag 18 in time, the work order may be automatically re-locked. The worker may then be required to re-scan the NFC tag 18 again to unlock the work order again. When the worker has completed the work order, the next scan of the NFC tag 18 may re-lock the work order and cause the re-locked work order to be transmitted.

In some examples, the scanning of an NFC tag 18 may have additional uses (in addition to un-locking and re-locking a work order). For example, a supervisor (or other worker) may scan a particular NFC tag 18, causing all previously completed work orders (and/or any other information associated with the asset 14) to be received at the mobile device 22 and/or pulled up for viewing (e.g., in a list format). This may allow a supervisor to check that work was performed satisfactorily, without having to bring all the completed work orders with them, or without requiring the supervisor to search for each individual work order that applies to that asset 14.

In some examples, the mobile device 22 may have a timer that keeps track of the amount of time that a work order is unlocked. This time may be added to the work order when it is re-locked. As such, the system 10 may be able to keep track of the amount of time that the worker was working on the asset 14. That amount of time may then be compared to time estimates associated with the work. If they differ by a significant amount, the recorded time may be an indication that the worker was not working properly, in some examples.

In some examples, the NFC tags 18 may also be written to by the mobile device 22. This may allow portions of the completed work order to be written to an NFC tag 18 included on an asset 14. For example, the result of a test (e.g., pass, fail) may be written to an NFC tag 18 after the asset 14 has been tested.

In some examples, although system 10 has been described above as operating using an NFC reader 50 and NFC tags 18 (via near field communications), in other examples, system 10 may operate using any other proximity sensing devices. Examples of such proximity sensing devices include radio frequency identification (RFID) readers and RFID tags, any other items or devices that can detect that a worker is in close proximity to an asset 14 that the worker is working on, or any combination of the preceding.

In various examples, the herein described systems (e.g., system 10), devices (e.g., mobile device(s) 22 and management device(s) 54), components of the devices, and methods may be implemented in software, firmware, or executable instructions stored in a data storage medium such as or including machine-readable medium. The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. Some examples may be implemented using a machine-readable medium or article which may store an instruction or a set of instructions that, if executed by a machine, may cause the machine to perform a method and/or operations in accordance with the examples. Such a machine may include, for example, any suitable processing platform, computing platform, computing device, processing device, computing system, processing system, computer, processor, or the like, and may be implemented using any suitable combination of hardware and/or software. Computers and computer systems described herein (e.g., mobile device(s) 22 and management device(s) 54) may include operatively associated computer-readable memory media such as memory for storing software applications and instructions used in obtaining, processing, storing or communicating data. It can be appreciated that such memory can be internal, external, remote or local with respect to its operatively associated computer or computer system. Memory may also include any manner of storing software or other instructions including, for example and without limitation, solid state RAM storage, a hard disk, an optical disk, floppy disk, DVD, compact disc, memory stick, flash drive, compact disc flash drive, ROM (read only memory), RAM (random access memory), PROM (programmable ROM), EEPROM (extended erasable PROM), or other like computer-readable media. The machine-readable medium or article may include, for example, any suitable type of memory unit, memory device, memory article, memory medium, storage device, storage article, storage medium and/or storage unit, for example, memory, removable or non-removable media, solid state random access media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like.

It will be further apparent to one of ordinary skill in the art that some of the examples as described hereinabove may be implemented in many different examples of instruction (e.g., software or firmware) and hardware. The instructions may include any suitable type of code, such as source code, compiled code, interpreted code, executable code, static code, dynamic code, and the like. The actual software code or specialized control hardware used to implement some of the illustrated examples do not limit the present disclosure. The instructions may be implemented, for example, using any suitable programing language, which may include high-level, low-level, object-oriented, visual, compiled or interpreted programming languages, such as, but not limited to, C, C++, C#, Java, BASIC, SQL, Perl, Matlab, Pascal, Visual BASIC, Go, Python, R, Java Script, Typescript, Objective C, Swift, assembly language, machine code, and so forth. The examples are not limited in this context.

The methods (e.g., method 200), systems (e.g., system 10), devices (e.g., mobile device(s) 22 and management device(s) 54)), and components of the devices have been illustrated and described herein as comprising several separate functional elements, such as modules or units. Although certain of such modules or units may be described by way of example, it can be appreciated that a greater or lesser number of modules or units may be used and still fall within the scope of the examples. Further, although various examples may be described in terms of modules or units to facilitate description, such modules or units may be implemented by one or more hardware components (e.g., embedded systems/peripherals, processors, chips, FPGAs, DSPs, PLDs, ASICs, circuits, registers, servers, clients, network switches and routers), software components (e.g., programs, subroutines, logic) and/or combination thereof. It can be appreciated that, in certain aspects, a single component may be replaced by multiple components, and multiple components may be replaced by a single component, to provide an element or structure or to perform a given function or functions. Except where such substitution would not be operative to practice certain examples of the present disclosure, such substitution is considered within the scope of the present disclosure. In one example, all or a portion of the system, its features or functional elements, modules, units, etc. or one or more steps of the method may be associated with, implemented by, executed on, or embedded in (e.g., as embedded software/firmware) one or more hardware components. Further, such one or more components so configured may be installed or associated with one or more devices and therein configured to perform the herein described system functionalities or methods. The modules or units may comprise, or be implemented as, one or more systems, sub-systems, devices, components, circuits, logic, programs, or any combination thereof, as desired for a given set of design or performance constraints. For example, the modules may comprise electronic elements fabricated on a substrate. In various implementations, the electronic elements may be fabricated using silicon-based IC processes such as complementary metal oxide semiconductor (CMOS), bipolar, and bipolar CMOS (BiCMOS) processes, for example. The examples are not limited in this context.

It may be appreciated that terms such as "processing", "generating", "determining", or the like, unless stated otherwise, refer to the action or processes of a computer or computing system, or similar electronic computing device, that manipulates or transforms data represented as physical quantities (e.g., electronic) within the computing system's registers or memories into other data similarly represented as physical quantities within the computing system's memories, registers or other such information storage, transmission or display devices. The examples are not limited in this context. An action such as "identifying" or "matching" when performed by a computer or computer system may include identification by determining, accessing system data, comparisons with system data, instructions, or the like. An action such as initiating may include causing an event or thing initiated either directly or indirectly. For example, initiating may include signaling, providing power or instructions, physical manipulation, transmission of data, calculation of conditions, or other step resulting in the event sought to be initiated. Furthermore, an action such as "storing", when used in reference to a computer or computer system, refers to any suitable type of storing operation including, for example, storing a value to memory, storing a value to cache memory, storing a value to a processor register, and/or storing a value to a non-volatile data storage device.

This specification has been written with reference to various non-limiting and non-exhaustive examples. However, it will be recognized by persons having ordinary skill in the art that various substitutions, modifications, or combinations of any of the disclosed examples (or portions thereof) may be made within the scope of this specification. Thus, it is contemplated and understood that this specification supports additional examples not expressly set forth in this specification. Such examples may be obtained, for example, by combining, modifying, or reorganizing any of the disclosed components, elements, features, aspects, characteristics, limitations, and the like, of the various non-limiting and non-exhaustive examples described in this specification. In this manner, Applicant reserves the right to amend the claims during prosecution to add features as variously described in this specification.

What is claimed is:

1. A method comprising:

receiving, by one or more processors of a mobile device, one or more work orders associated with work scheduled for one or more assets, wherein each of the one or more work orders is at least partially viewable on the mobile device and wherein each of the one or more work orders is locked to editing from the mobile device;

receiving, by the one or more processors of the mobile device, an indication that a near field communication (NFC) reader of the mobile device has received first data from a NFC tag associated with a first asset of the one or more assets as a result of the NFC reader of the mobile device having been positioned in communication proximity to the NFC tag associated with the first asset, wherein the indication that the NFC reader of the mobile device has received the first data from the NFC tag associated with the first asset comprises a unique code received from the NFC tag associated with the first asset;

following the reception of the indication that the NFC reader of the mobile device has received the first data from the NFC tag associated with the first asset:

searching, by the one or more processors of the mobile device, the one or more work orders to determine a first work order of the one or more work orders that includes a unique code entry that matches the unique code received from the NFC tag associated with the first asset; and following the determination that the first work order includes the unique code entry that matches the unique code received from the NFC tag associated with the first asset, unlocking, by the one or more processors of the mobile device, the first work order, wherein the first work order is associated with the first asset;

applying, by the one or more processors of the mobile device, one or more edits to the first work order;

receiving, by the one or more processors of the mobile device, an indication that the NFC reader of the mobile device has subsequently received second data from the NFC tag associated with the first asset as a result of the NFC reader of the mobile device having been subsequently positioned in communication proximity to the NFC tag associated with the first asset; and following the reception of the indication that the NFC reader of the mobile device has subsequently received the second data from the NFC tag associated with the first asset:

re-locking, by the one or more processors of the mobile device, the edited first work order so that the re-locked and edited first work order is locked to further editing from the mobile device; and causing, by the one or more processors of the mobile device, the re-locked and edited first work order to be transmitted to a second device.

2. The method of claim 1, wherein the NFC reader of the mobile device having been positioned in communication proximity to the NFC tag associated with the first asset comprises at least a portion of the mobile device having physically contacted the NFC tag associated with the first asset.

3. The method of claim 2, wherein the at least the portion of the mobile device having physically contacted the NFC tag associated with the first asset comprises at least a portion of an external case or cover of the mobile device having physically contacted the NFC tag associated with the first asset.

4. The method of claim 1, wherein the NFC reader of the mobile device having been positioned in communication proximity to the NFC tag associated with the first asset comprises at least a portion of the mobile device having being positioned within approximately 4 centimeters of the NFC tag associated with the first asset.

5. The method of claim 1, wherein applying, by the one or more processors of the mobile device, the one or more edits to the first work order comprises attaching, by the one or more processors of the mobile device, one or more images or videos to the first work order in response to a user of the mobile device instructing the one or more processors of the mobile device to attach the one or more images or videos to the first work order.

6. The method of claim 1, wherein applying, by the one or more processors of the mobile device, the one or more edits to the first work order comprises adding, by the one or more processors of the mobile device, text to the first work order in response to a user of the mobile device instructing the one or more processors of the mobile device to add the text to the first work order.

7. The method of claim 1, wherein the one or more assets comprise one or more pieces of equipment.

8. The method of claim 1, wherein causing, by the one or more processors of the mobile device, the re-locked and edited first work order to be transmitted to the second device comprises transmitting, by the one or more processors of the mobile device, the re-locked and edited first work order to the second device.

9. The method of claim 1, further comprising preventing, by the one or more processors of the mobile device, each locked work order from being opened.

10. The method of claim 1, further comprising allowing, by the one or more processors of the mobile device, each locked work order to only be viewable on the mobile device in a read only format.

11. Tangible, non-transitory computer-readable media comprising program instructions that are configured, when executed, to cause a mobile device to perform functions comprising:

receiving one or more work orders associated with work scheduled for one or more assets, wherein each of the one or more work orders is at least partially viewable on the mobile device and wherein each of the one or more work orders is locked to editing from the mobile device;

receiving an indication that a near field communication (NFC) reader of the mobile device has received first data from a NFC tag associated with a first asset of the one or more assets as a result of the NFC reader of the mobile device having been positioned in communication proximity to the NFC tag associated with the first asset, wherein the indication that the NFC reader of the mobile device has received the first data from the NFC tag associated with the first asset comprises a unique code received from the NFC tag associated with the first asset;

following the reception of the indication that the NFC reader of the mobile device has received the first data from the NFC tag associated with the first asset:

searching the one or more work orders to determine a first work order of the one or more work orders that includes a unique code entry that matches the unique code received from the NFC tag associated with the first asset; and following the determination that the first work order includes the unique code entry that matches the unique code received from the NFC tag associated with the first asset, unlocking the first work order, wherein the first work order is associated with the first asset;

applying one or more edits to the first work order;

receiving an indication that the NFC reader of the mobile device has subsequently received second data from the NFC tag associated with the first asset as a result of the NFC reader of the mobile device having been subsequently positioned in communication proximity to the NFC tag associated with the first asset; and following the reception of the indication that the NFC reader of the mobile device has subsequently received the second data from the NFC tag associated with the first asset:

re-locking the edited first work order so that the re-locked and edited first work order is locked to further editing from the mobile device; and causing the re-locked and edited first work order to be transmitted to a second device.

12. The tangible, non-transitory computer-readable media of claim 11, wherein the NFC reader of the mobile device having been positioned in communication proximity to the NFC tag associated with the first asset comprises at least a portion of the mobile device having physically contacted the NFC tag associated with the first asset.

13. The tangible, non-transitory computer-readable media of claim 12, wherein the at least the portion of the mobile device having physically contacted the NFC tag associated with the first asset comprises at least a portion of an external case or cover of the mobile device having physically contacted the NFC tag associated with the first asset.

14. The tangible, non-transitory computer-readable media of claim 11, wherein the NFC reader of the mobile device having been positioned in communication proximity to the NFC tag associated with the first asset comprises at least a portion of the mobile device having being positioned within approximately 4 centimeters of the NFC tag associated with the first asset.

15. The tangible, non-transitory computer-readable media of claim 11, wherein applying the one or more edits to the first work order comprises attaching one or more images or videos to the first work order in response to a user of the mobile device instructing one or more processors of the mobile device to attach the one or more images or videos to the first work order.

16. The tangible, non-transitory computer-readable media of claim 11, wherein applying the one or more edits to the first work order comprises adding text to the first work order in response to a user of the mobile device instructing one or more processors of the mobile device to add the text to the first work order.

17. The tangible, non-transitory computer-readable media of claim 11, wherein the one or more assets comprise one or more pieces of equipment.

18. The tangible, non-transitory computer-readable media of claim 11, wherein causing the re-locked and edited first work order to be transmitted to the second device comprises transmitting the re-locked and edited first work order to the second device.

19. The tangible, non-transitory computer-readable media of claim 11, wherein the instructions are configured, when executed, to cause the mobile device to perform functions comprising preventing each locked work order from being opened.

20. A mobile device comprising:

a near field communication (NFC) reader;

one or more memory units storing one or instructions;

one or more processors coupled to the one or more memory units and configured, upon executing the one or more instructions, to:

receive one or more work orders associated with work scheduled for one or more assets, wherein each of the one or more work orders is at least partially viewable on the mobile device and wherein each of the one or more work orders is locked to editing from the mobile device;

receive an indication that the NFC reader of the mobile device has received first data from a NFC tag associated with a first asset of the one or more assets as a result of the NFC reader of the mobile device having been positioned in communication proximity to the NFC tag associated with the first asset, wherein the indication that the NFC reader of the mobile device has received the first data from the NFC tag associated with the first asset comprises a unique code received from the NFC tag associated with the first asset;

following the reception of the indication that the NFC reader of the mobile device has received the first data from the NFC tag associated with the first asset:

search the one or more work orders to determine a first work order of the one or more work orders that includes a unique code entry that matches the unique code received from the NFC tag associated with the first asset; and following the determination that the first work order includes the unique code entry that matches the unique code received from the NFC tag associated with the first asset, unlock the first work order, wherein the first work order is associated with the first asset;

apply one or more edits to the first work order;

receive an indication that the NFC reader of the mobile device has subsequently received second data from the NFC tag associated with the first asset as a result of the NFC reader of the mobile device having been subsequently positioned in communication proximity to the NFC tag associated with the first asset; and following the reception of the indication that the NFC reader of the mobile device has subsequently received the second data from the NFC tag associated with the first asset:

re-lock the edited first work order so that the re-locked and edited first work order is locked to further editing from the mobile device; and cause the re-locked and edited first work order to be transmitted to a second device.

* * * * *